Sept. 2, 1924.

R. MANCHA 1,506,848

CHARGING STATION FOR STORAGE BATTERY LOCOMOTIVES

Filed Sept. 12, 1923

INVENTOR
Raymond Mancha.
BY Bakewell & Church
ATTORNEYS

Sept. 2, 1924.

R. MANCHA 1,506,848

CHARGING STATION FOR STORAGE BATTERY LOCOMOTIVES

Filed Sept. 12, 1923

INVENTOR
Raymond Mancha.
By Bakewell Church
ATTORNEYS

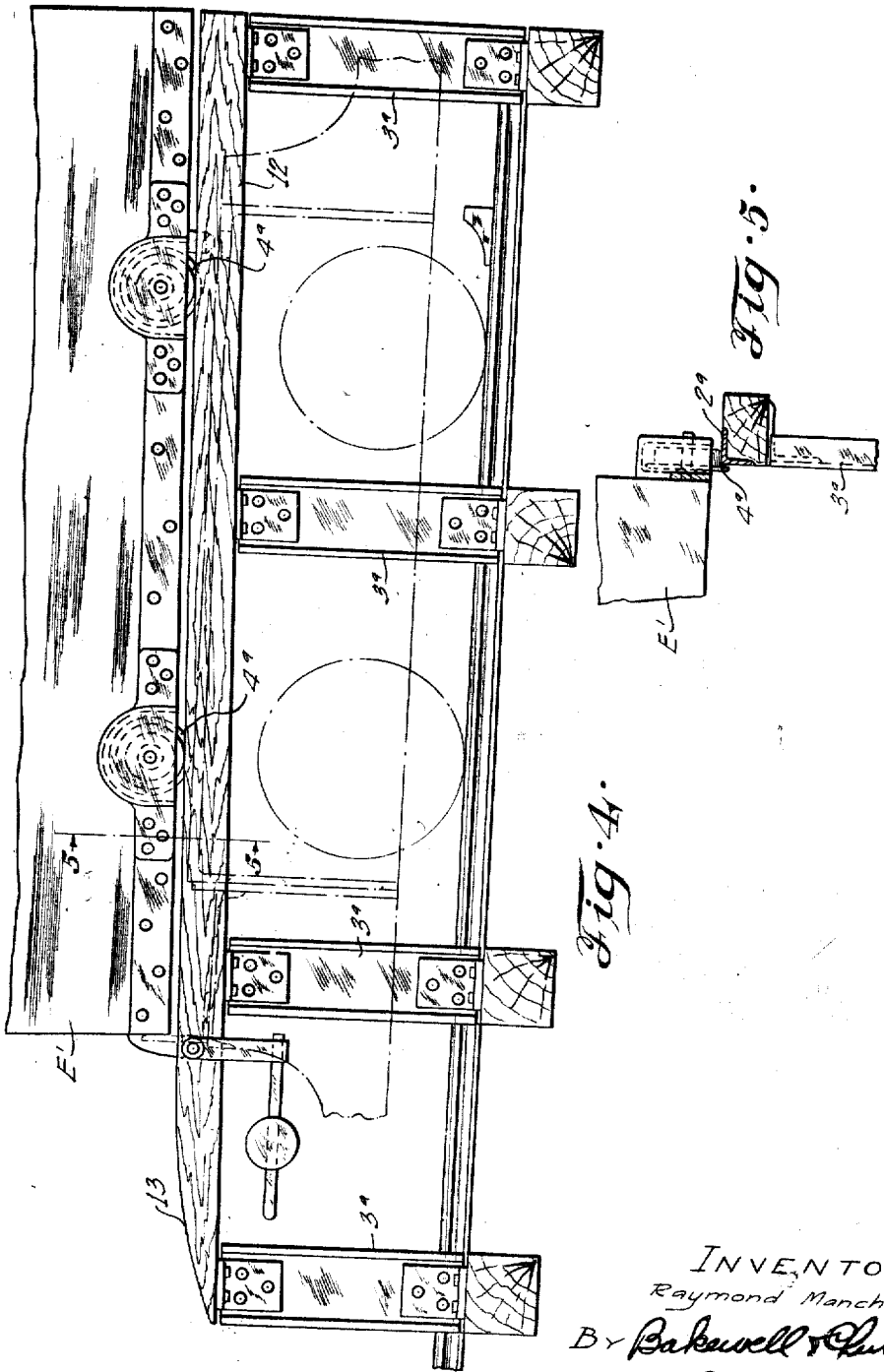

Patented Sept. 2, 1924.

1,506,848

UNITED STATES PATENT OFFICE.

RAYMOND MANCHA, OF ST. LOUIS, MISSOURI, ASSIGNOR TO MANCHA STORAGE BATTERY LOCOMOTIVE COMPANY, OF ST. LOUIS, MISSOURI, A CORPORATION OF DELAWARE.

CHARGING STATION FOR STORAGE-BATTERY LOCOMOTIVES.

Application filed September 12, 1923. Serial No. 662,211.

*To all whom it may concern:*

Be it known that I, RAYMOND MANCHA, a citizen of the United States, residing at St. Louis, Missouri, have invented a certain new and useful Improvement in Charging Stations for Storage-Battery Locomotives, of which the following is a full, clear, and exact description, such as will enable others skilled in the art to which it appertains to make and use the same.

This invention relates to storage battery locomotives of the type in which the battery box is removably mounted on the chassis of the locomotive so that a set of charged batteries can be substituted easily for a set of discharged batteries by removing the box that contains the discharged batteries and replacing it with a box that contains a set of charged batteries, thereby overcoming the necessity of having the locomotive remain idle or out of service while the batteries are being recharged.

The battery boxes of locomotives of the kind referred to are difficult to handle, as they vary in size from 36 inches to 81 inches in width by 36 inches to 120 inches in length and vary in weight from 1000 pounds to 14000 pounds. Prior to my present invention it was the usual practice to use a block and tackle in the operation of changing the batteries of a storage battery locomotive, but this method of changing batteries is slow and laborious, and moreover, requires the services of a careful and experienced workman.

One object of my present invention is to provide a means for removing the battery box from the chassis of a storage battery locomotive and for mounting a battery box on the chassis, that reduces the time and labor involved in changing batteries and also eliminates the possibility of injuring the battery by subjecting it to a severe jolt or blow, as so often occurs when a battery box is being handled by a block and tackle.

Another object is to provide a battery box unloading apparatus for storage battery locomotives which is so constructed that the movement of the locomotive along a certain path causes the battery box on the chassis to be raised automatically onto a supporting structure on which it can be maintained during the operation of recharging the batteries.

Another object is to provide a battery box loading device for storage battery locomotives which is so constructed that a battery box carried by said device can be deposited easily on the chassis of a locomotive moving along a path in proximity to said device.

And still another object of my invention is to provide a charging station for charging battery locomotives which is equipped with a plurality of battery box supporting structures of such design that when a locomotive whose batteries require recharging is run into the station, the battery box of the locomotive will be removed automatically from the chassis and deposited on one of said supporting structures, after which the locomotive can be moved into operative relationship with one of the other supporting structures that contains a set of charged batteries and said set of charged batteries lowered into operative position on the chassis of the locomotive either by gravity, by the movement of the locomotive relatively to the supporting structure or by the combined action of gravity and movement of the locomotive relatively to the supporting structure. Other objects and desirable features of my invention will be hereinafter pointed out.

Figure 1 of the drawings is a top plan view of a charging station for storage battery locomotives constructed in accordance with my invention.

Figure 4 is a side elevational view of a battery box supporting structure of slightly different design; and Figure 5 is a detail sectional view, taken on the sectional line 5—5 of Figure 4.

Figure 1:
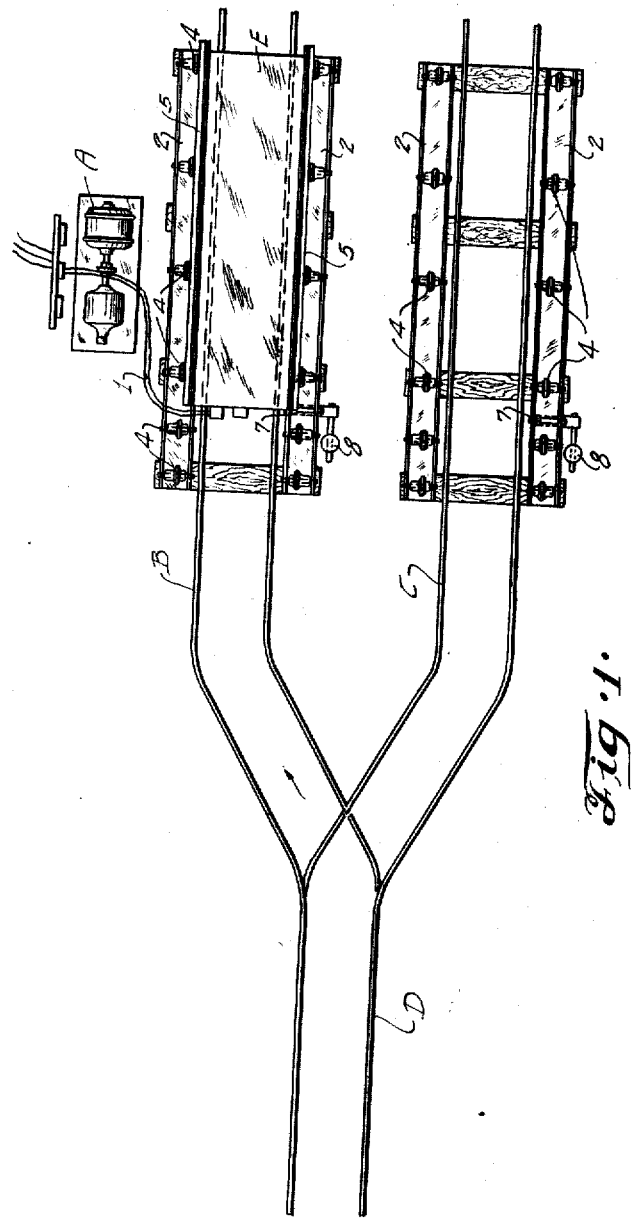

Referring to the drawings which illustrate the preferred form of my invention, A designates a storage battery charging apparatus of any suitable design that is arranged in proximity to two railway tracks B and C that are combined with a railway track D in such a way that an electric storage battery locomotive which travels on the track D can be run on to either of the tracks B or C. Two battery box supporting devices of identical construction are combined with the tracks B and C so as to enable a locomotive whose batteries are low or discharged to be run into the station and the battery box removed from the chassis of the locomotive and deposited on one of said supporting devices and the locomotive thereafter moved into proximity to the other supporting device on which a charged battery is positioned, the battery charging apparatus A being equipped with an electrical conductor 1 of sufficient length to enable the charging apparatus A to be connected with batteries on either of the battery box supporting devices associated with the tracks B and C.

Each of the battery box supporting devices previously referred to is preferably so constructed that when the locomotive is moved in one direction over the track with which said device is associated, the battery box on the chassis of the locomotive will be raised automatically and deposited on said supporting device by the movement of the locomotive relatively to said supporting device, thereby causing the battery box to be automatically removed from the chassis. The removal of the battery box from the supporting device onto the chassis of the locomotive is also effected automatically either by gravity, by the movement of the locomotive relatively to the battery box supporting device, or by the combined action of gravity and movement of the locomotive relatively to the battery box supporting device.

Figure 2:
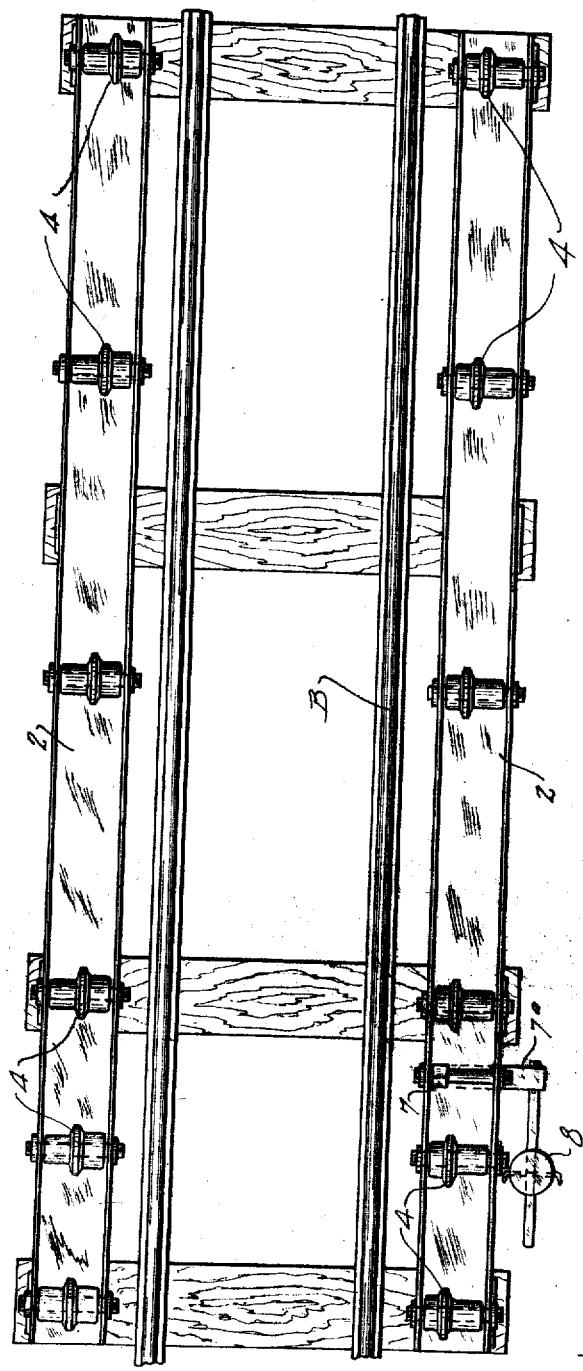
Figure 2 is a top plan view of one of the battery box supporting structures at said station.

While the form or design of the battery box supporting devices may vary greatly without departing from the spirit of my invention, each of said devices will usually consist of an elevated supporting structure composed of two horizontal or substantially horizontally-disposed rails 2 carried by pedestals or uprights 3 of any suitable design and arranged at such a height with relation to the track rails B or C that when the locomotive is moved longitudinally of said supporting structure in one direction parts on the battery box will co-operate with the rails 2 to lift the battery box from the chassis of the locomotive and cause said battery box to be deposited on the rails 2. In the form of my invention illustrated in Figures 1, 2 and 3 the rails 2 of the supporting structure that is associated with the track rails B are inclined slightly with relation to said track rails B and are equipped with flanged rollers 4 that are adapted to be engaged by laterally-projecting flanges 5 on the sides of the battery box E mounted on the chassis of the locomotive which is indicated by broken lines in Figure 3. Assuming that the locomotive is traveling in the direction indicated by the arrow in Figure 1, over the track B, the upwardly inclined portions 5ª of the flanges 5 on the sides of the battery box first engage the rollers 4 at the left hand end of the inclined rails 2 of the battery box supporting structure associated with the track B and travel up onto said rollers, thereby raising the battery box slightly from the chassis of the locomotive. As the locomotive continues to move in this direction over the track B, the flanges 5 on the battery box travel over the succeeding rollers 4 of the rails 2, thus causing the battery box to continue to move upwardly, due, of course, to the upward inclination of the rails 2, and consequently, causing the battery box to be completely removed from the chassis of the locomotive by the time the battery box reaches the right hand end of the supporting structure. The locomotive can now be moved in the opposite direction over the track B and switched onto the track C and moved into proximity to the other battery box supporting structure associated with said track C, which supporting structure we will assume carries a battery box equipped with a set of storage batteries that have been on charge.

Each of the tracks B and C is provided with wheel chocks 6 or other suitable devices that co-operate with the wheels or any other suitable portion of the chassis of the locomotive to limit the movement of the locomotive relatively to the battery box supporting devices during the operation of unloading discharged batteries or mounting charged batteries, and each of the battery box supporting devices is provided with a retaining element 7 for maintaining the battery box in operative position on said supporting structures. In the form of my invention shown in Figures 1, 2 and 3 one rail of each of the supporting structures is provided with a retaining element 7 connected to a pivotally mounted dog 7ª that is combined with a weight 8 in such a way that it will swing in a direction to permit the battery box to travel up onto the rollers 4 of the supporting structure during the operation of removing the battery box from the chassis of the locomotive, and thereafter will swing upwardly into operative position, as shown in Figure 3, and serve as a stop which arrests the movement of the battery box in the opposite direction, or in other words, prevents the battery box from moving longitudinally towards the lower end of the supporting structure formed by the inclined rails 2.

My invention is not limited to any particular type or kind of electric storage battery locomotive, but in order to effect the movement of the battery box lengthwise of the battery box supporting structure, after one end of the battery box has been lifted or raised onto the lower end of the supporting structure, it is essential that some means be provided for continuing the movement of the battery box longitudinally of the supporting structure. I have herein illustrated my invention used in connection with a storage battery locomotive whose battery box is equipped with one or more depending pins 9 that enter openings 10 in the chassis of the locomotive and whose chassis is provided with an upwardly-projecting member 11 that engages one end of the battery box, as shown in broken lines in Figure 3, the pins 9 co-coperating with the holes 10 to hold the battery box centered with relation to the chassis and the upwardly-projecting member 11 on the chassis causing the battery box to be moved lengthwise of the battery box supporting structure after the pins 9 have been withdrawn from the holes 10 in the chassis. In a storage battery locomotive of the kind referred to the battery box E will be removed automatically from the chassis of the locomotive, deposited on the supporting structure formed by the rails 2 and uprights 3 when the locomotive moves over the rails B to the right in Figure 3, and said battery box will be held or locked in operative position on said supporting structure after it reaches such a point thereon that the retaining element 7 can swing upwardly into the position shown in Figure 3. After the battery box has been deposited on the supporting structure, the locomotive can be moved in the opposite direction, or to the left, looking at Figure 3, without disturbing the battery box or causing it to move relatively to the supporting structure, due, of course, to the fact that the co-operating flanges 5 and rollers 4 on the battery box and on the supporting structure maintain the battery box in an elevated position clear of the chassis. When it is desired to re-mount the battery box on the locomotive, the locomotive is moved over the rails B into a position beneath the battery box, and the retaining element 7 is then tripped or moved in a direction to release the battery box and permit it to move downwardly over the inclined rails 2 until one end of said box engages the upwardly-projecting member 11 on the chassis. Thereafter, when the locomotive is moved to the left over the rail B, gravity causes the battery box to travel longitudinally of the supporting structure towards the lower end of same, and finally become deposited in operative position on the chassis of the locomotive by the time the locomotive has passed beyond the supporting structure, on which the battery box was positioned while it was being re-charged. In the form of my invention shown in Figure 3 the inclined rails 2 of the battery box supporting structure are formed by channel-shaped members arranged with their side flanges presented upwardly and the rollers 4 are arranged between said side flanges and journaled on same, but I wish it to be understood that my invention is not limited to a supporting structure of this particular design.

Figure 3:
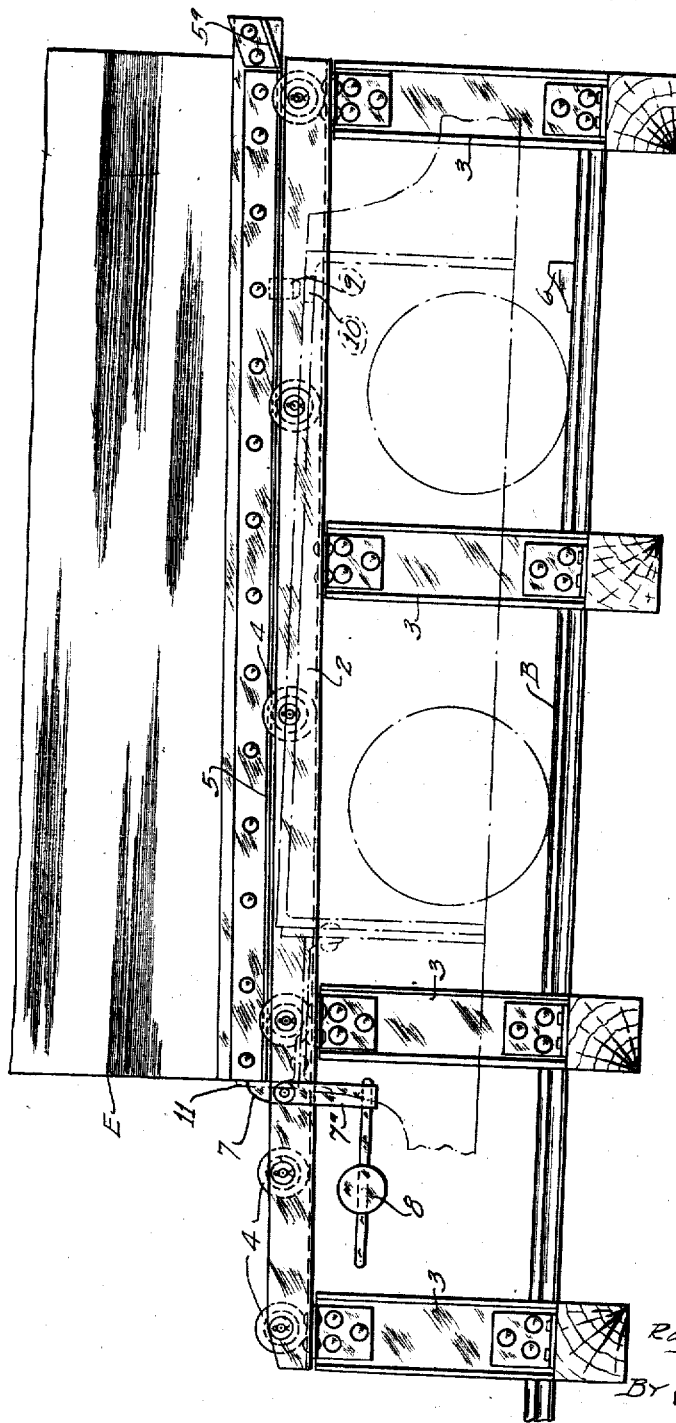
Figure 3 is a side elevational view of said battery box supporting structure.

In the form of my invention illustrated in Figure 3 the battery box supporting structures of the charging station have inclined rails that are equipped with rollers which co-operate with laterally-projecting flanges on the sides of the battery box. It is immaterial, however, whether rollers be mounted on the supporting structures or on the battery boxes, and therefore, in Figures 4 and 5 of the drawings I have illustrated another form of my invention, wherein the battery box E' is provided at its sides with rollers $4^a$ that travel on flat rails $2^a$ formed by angle bars connected to inclined beams 12 supported by uprights $3^a$, the rollers $4^a$ preferably being flanged, as shown in Figure 5, so as to hold the battery box centered with relation to the battery box supporting structure and prevent it from shifting transversely of said supporting structure. As shown in Figure 4, the beams 12 which carry the rails $2^a$ have upwardly-inclined portions at the lower end of the supporting structure, as indicated by the reference character 13, so as to cause the battery box to move upwardly with relation to the chassis of the locomotive when the rollers $4^a$ at the front end of the battery box strike said inclined portions 13.

Due to the fact that the supporting structure on which the battery box is mounted when the batteries are being recharged are inclined, it is sufficient, in most instances, during the operation of mounting a battery box on a locomotive, to merely trip the retaining element 7 or move it into an inoperative position, as the battery box is heavy enough to cause it to travel downwardly over the supporting structure and hold one end of the battery box in engagement with the upwardly-projecting member 11 on the chassis of the locomotive. If desired, however, the member 11 or some other part on the chassis of the locomotive can be bolted or otherwise fastened to the battery box, preparatory to tripping the retaining element 7, and the locomotive thereafter moved to the left, looking at Figures 3 and 4, or away from the battery box supporting structure, thus causing the battery box to be pulled longitudinally of the supporting structure by the movement of the locomotive.

A storage battery charging station of the construction above described reduces the time and labor of changing the storage batteries used to operate a storage battery locomotive, as it enables a locomotive whose batteries require re-charging to be run onto the track B into proximity to a device which causes the battery box of the locomotive to be raised automatically from the chassis and maintained in an elevated position high enough above the locomotive to permit the locomotive to be moved in the opposite direction over the track B and then switched onto the track C and moved into proximity to a similar battery box supporting device that contains a set of batteries that have been on charge, which charged batteries can be mounted on the chassis of the locomotive simply by releasing a retaining element and permitting or causing the box in which the batteries are housed to move downwardly onto the chassis when the locomotive is moved in the reverse direction over the track C.

Having thus described my invention, what I claim as new and desire to secure by Letters Patent is:

1. A charging station for storage battery locomotives provided with a plurality of supporting devices on which battery boxes are adapted to be mounted during the operation of re-charging the batteries contained in said boxes, and means whereby a battery box containing discharged batteries will be removed from the chassis of a locomotive and deposited on one of said supports when the locomotive is moved in one direction in proximity to said support and a battery box containing charged batteries will be removed from the other support and deposited on the chassis of the locomotive when the locomotive is moved in the opposite direction in proximity to said other support.

2. A charging station for storage battery locomotives provided with a plurality of tracks arranged so that a storage battery locomotive can be run onto either of said tracks, and means associated with said tracks for automatically removing a battery box from a locomotive that is moving over one of said tracks and sustaining said box while the batteries in same are being re-charged and for thereafter mounting said battery box on the chassis of the locomotive.

3. A charging station for storage battery locomotives provided with means whereby the operation of moving a storage battery locomotive to a certain point in the station causes the battery box of the locomotive to be removed from the chassis and sustained in a position where the batteries can be re-charged and the operation of moving said locomotive to a different point in the station causes a battery box containing charged batteries to be mounted on the chassis of the locomotive.

4. A charging station for storage battery locomotives, comprising a battery charging apparatus, a plurality of supporting devices adapted to sustain battery boxes whose batteries are being re-charged by said apparatus, and means on each of said supporting devices that is adapted to co-operate with the battery box of a locomotive that is moving in one direction in proximity to said device for causing said battery box to be raised from the chassis of the locomotive and deposited on said device.

5. A charging station for storage battery locomotives, comprising a battery charging apparatus, a plurality of supporting devices adapted to sustain battery boxes whose batteries are being re-charged by said apparatus, and means on each of said supporting devices that is adapted to co-operate with the battery box of a locomotive that is moving in one direction in proximity to said device for causing said battery box to be raised from the chassis of the locomotive and deposited on said device, said means being so constructed that the battery box can be re-mounted on the chassis of the locomotive by moving the locomotive in the opposite direction in proximity to said supporting device.

6. A charging station for storage battery locomotives, comprising a battery charging apparatus, a plurality of supporting devices adapted to sustain battery boxes whose batteries are being re-charged by said apparatus, means on each of said supporting devices that is adapted to co-operate with the battery box of a locomotive that is moving in one direction in proximity to said device for causing said battery box to be raised from the chassis of the locomotive and deposited on said device, and means for preventing accidental movement of the battery box relatively to said supporting device.

7. A device for the purpose described consisting of a supporting structure arranged adjacent a track on which a storage battery locomotive is adapted to be run, said structure being provided with inclined rails so positioned with relation to said track that when a locomotive is moved in one direction over the track parts on the battery box of the locomotive will ride up onto said rails, thereby causing the battery box to be removed from the chassis of the locomotive and sustained by said rails, and means for preventing the battery box from moving accidentally over said rails towards the low end of the supporting structure.

8. A device for the purpose described, comprising inclined members adapted to sustain a battery box and arranged over a track on which a storage battery locomotive travels, and a retaining element for preventing a battery box positioned on said members from moving longitudinally of same under the influence of gravity, said retaining element being adapted to be rendered inoperative so that gravity will cause the battery box to move from said members onto a locomotive that is traveling over said track in the direction of movement of the battery box.

9. The combination of a storage battery locomotive, a battery box removably mounted on said locomotive, a stationary battery box supporting structure arranged adjacent a track on which said locomotive travels, and co-operating means on said battery box and on said supporting structure for causing the battery box to be automatically removed from the locomotive and sustained by said structure when the locomotive moves to a point in proximity to said structure.

RAYMOND MANCHA.